June 29, 1943.  G. S. BINCKLEY  2,322,814
VISCOSIMETER
Filed Dec. 7, 1940
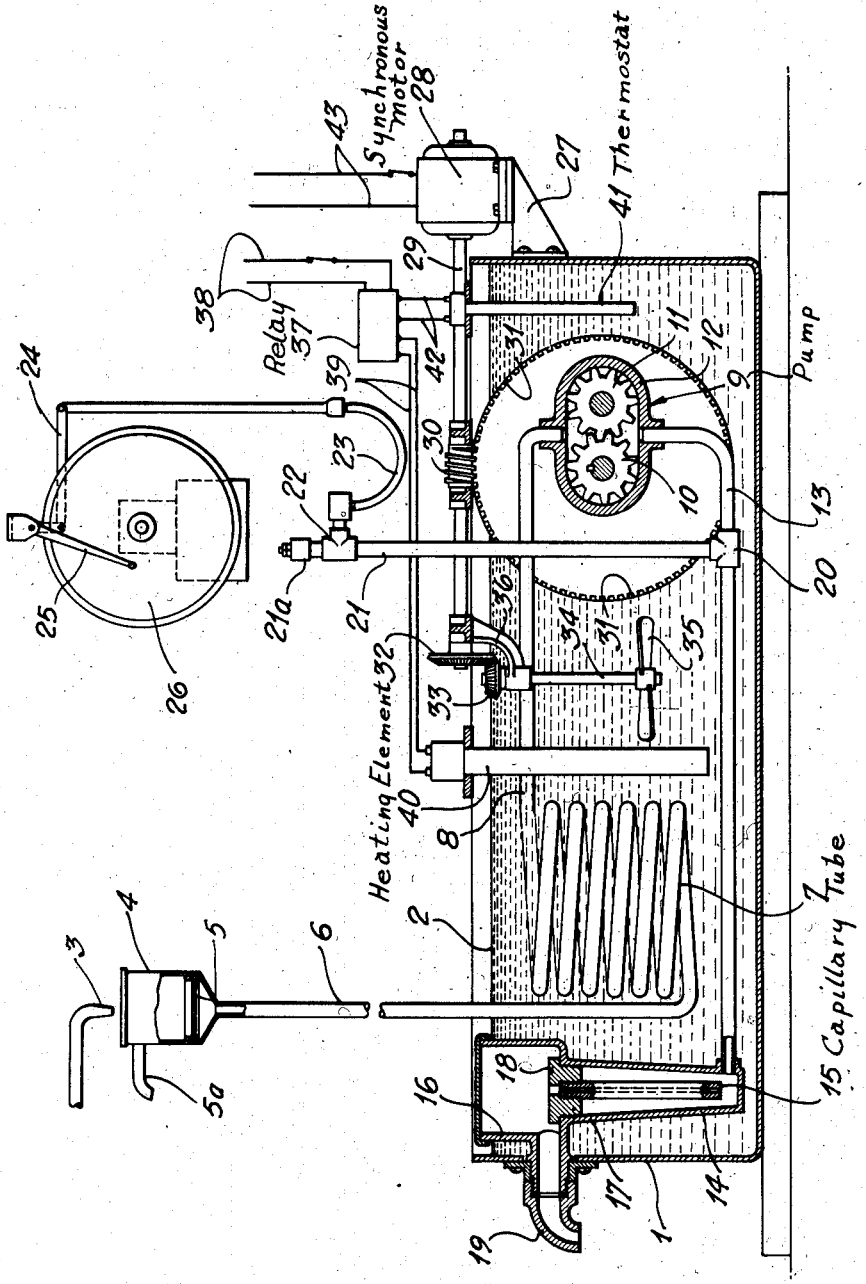
GEORGE S. BINCKLEY,
INVENTOR.
BY
ATTORNEY Patented June 29, 1943

2,322,814

UNITED STATES PATENT OFFICE 2,322,814

VISCOSIMETER

George S. Binckley, Los Angeles, Calif., assignor, by decree of court and mesne assignments, to Sydney William Binckley, as trustee Application December 7, 1940, Serial No. 369,009

5 Claims. (Cl. 265—11)

This invention relates to a recording and/or indicating viscosimeter.

The invention has for an object the provision of a device by which the absolute viscosity of a continuously flowing sample of liquid is indicated or automatically recorded on a chart.

A further object is the provision of a device whereby accurate measurement of the absolute viscosity of the liquid sample may be recorded.

A further object is the provision of means for the purpose stated which is simple of construction, accurate in operation, parts readily accessible for removal, examination and cleaning, does not require a skilled operator, of few parts, inexpensive in cost of manufacture, and generally superior.

With the above mentioned and other objects in view, the invention consists in the novel and useful provision, formation, construction, association, and relative arrangement of parts, members and features, all as shown in a certain embodiment in the accompanying drawing, described generally, and more particularly pointed out in the claims.

In the drawing:

The figure is schematic and in section, and illustrates various instrumentalities entering into the construction of the device.

Referring now to the drawing, I provide a tank 1 which may be of any form best adapted to enclose the elements hereinafter set forth. This tank primarily acts to hold some liquid 2 therein, which liquid may be water, and within which liquid is placed some of the various instrumentalities entering into the invention. In other words, the liquid acts as a water bath for certain of the apparatus. Specifically, the sample liquid under test is adapted to be directed by some means, such as a tube 3 into a container 4 of any form provided with a filter 5 and overflow 5ª. A tube 6 leads from the container 4 to a coil 7. In the present instance, the coil is in the form of a helix with a tube 8 leading from said coil to a pump 9. This pump may be of the ordinary intermeshing gear type, as shown at 10 and 11, enclosed within a suitable casing 12, with an eduction tube 13 leading from the pump casing to a housing 14. This housing 14 has depending therein, a capillary tube 15. The upper end of the housing is enlarged, as shown at 16, and between the enlargement and the part 17 of the housing, and carrying the capillary tube 15, is the support 18. An outlet member 19 communicates with the interior of the enlarged portion 16 of the housing 14. At some point intermediate the pump 9 and the housing 14 is a fitting 20, to which a tube 21 is connected leading exteriorly of the tank 1 and through a fitting 22, the said tube 21 connects with a Bourdon tube 23. The Bourdon tube in turn communicates with suitable linkage 24 adapted to actuate, in the present instance, some indicating instrumentality, such as a pen arm 25, the pen of which is adapted for play over a chart 26, which may be revolved by the usual clockwork mechanism (not shown). Secured exteriorly of the tank 1 is a bracket 27 carrying a motor 28, the shaft 29 of which motor is adapted to drive a worm 30 in mesh with the teeth of gear 31, the gear 31 driving the pump gear 10. An end of the shaft carries a bevel gear 32 in mesh with bevel gear 33, gear 33 driving shaft 34, the end of which carries a propeller 35. Suitable mounting brackets 36 are provided between the shafts 29 and 34.

37 is a relay in communication with a source of electrical current 38. Leads 39 from said relay communicate with a heating element 40 immersed in the liquid 2 in the tank 1. 41 is a thermostat of the bimetal or mercury type adapted to be immersed within the liquid 2 and leads communicate with said thermostat and the relay 37 shown at 42. Suitable leads 43 connect with the motor 28.

The operation, uses and advantages of the invention are as follows:

An essential condition for the successful operation of the recording and indicating viscosimeter is the constancy of the volume of liquid which is forced by the pump 9 through the capillary tube 15. This constancy of volume is assured by the use of a positive pump 9, whether it be of the gear type shown or of the reciprocating type having a constant rate of piston travel operated by a synchronous motor 28, or other source of power, which provides a constant rate of revolution through the worm and gear 30 and 31, respectively, of the pump 9. The volume of liquid which is forced through the capillary tube 15 being constant, and the temperature of the liquid 2 within the tank 1 being maintained at a constant standard (by the heating element 40 controlled by the thermostat 41 through relay 37 which permits energization and deenergization of said heating element 40, plus agitation of the liquid by the propeller 35), the pressure required to force this constant volume of liquid sample through the capillary tube 15 is an accurate measure of the absolute viscosity of the liquid sample, and the variations of this pressure, by acting through the Bourdon tube 23 provide on the chart 26 a true record of the variations in the absolute viscosity of the continuous sample of liquid.

A slight excess above the actual volume of liquid passing through the instrument is fed into the container 4, this excess passing away through the overflow 5ª.

It may be noted that the gear pump is revolved very slowly through the worm and gear 30 and 31. The gear pump operates on the suction principle and it is evident that in place of said gear pump, I may use a reciprocating type of pump placed somewhere in the tubing 6. Such an arrangement would provide for a positive pressure of the sample in its passage through the coil 7 to the capillary tube. I have shown the various essential elements of the invention immersed in the water bath for the purpose of maintaining the sample at a given temperature. It is obvious the passage of the sample through the helical coil 7 will bring the same to the given or selected temperature of the water bath and further passage through the closed circuit formed by the coil, pump and capillary tube will maintain such given temperature. It is evident, however, that the connection with the Bourdon tube does not require the maintenance of a standard temperature bath as operation of the tube is purely a matter of pressure and not of flow through a tube. To protect the Bourdon tube against excessive pressure, a safety valve is provided at 21ª.

The invention is easily calibrated and records accurately the absolute viscosity of the liquid.

I claim:

1. A continuous flow viscosimeter including a coil, pump and capillary tube connected in a closed circuit through which a sample liquid is passed for recording pressure variations, a tank adapted to hold a liquid, means for maintaining said liquid at a selected temperature, the coil, pump and capillary tube being arranged in the tank and immersed in the liquid to bring the sample liquid to and maintain the selected temperature of the tank contained liquid during its passage through the closed circuit, and a pressure recording device connected to the closed system between the pump and capillary tube and positioned outside of the tank.

2. A continuous flow viscosimeter including a coil to initially receive a sample liquid, a receptacle adapted to hold a body of liquid, said coil being immersed in said body of liquid, means associated with said receptacle for maintaining said liquid at a selected temperature to bring the sample liquid to such temperature, a pump connected with said coil, a capillary tube connected with the pump through which the sample liquid is discharged, and said pump and capillary tube being also immersed in the body of liquid containing the coil to constantly maintain the sample liquid at said selected temperature.

3. A continuous flow viscosimeter including a coil to initially receive a sample liquid, a receptacle adapted to hold a body of liquid, said coil being immersed in said body of liquid, means associated with said receptacle for maintaining said liquid at a selected temperature to bring the sample liquid to such temperature, a pump connected with said coil, a capillary tube connected with the pump through which the sample liquid is discharged, said pump and capillary tube being also immersed in the body of liquid containing the coil to constantly maintain the sample liquid at said selected temperature, a Bourdon tube included between the pump and capillary tube operated by pressure of the sample liquid, and a recording device for indicating movement of the Bourdon tube.

4. A continuous flow viscosimeter including a closed circuit for a sample liquid comprising a coil, pump and capillary tube, a tank in which said elements are arranged and adapted to contain a body of water, a gear for the pump and an agitator for the body of water, a motor mounted on said tank for driving the pump gear and agitator, means for recording pressure variations of the sample liquid passing continuously through the closed circuit, and means for maintaining the body of water at a selected temperature to maintain the sample liquid at a constant temperature.

5. A continuous flow viscosimeter including a coil, pump and capillary tube successively connected in the order named to form a closed circuit through which a sample liquid is passed for recording pressure variations, a receptacle adapted to contain a constant temperature bath in which said elements are immersed as a unit to bring the sample liquid to the bath temperature during its passage through the coil and maintain such temperature during further passage of the liquid through the closed circuit, and means associated with said receptacle to maintain the constant temperature of the bath.

GEORGE S. BINCKLEY